United States Patent
Yang et al.

(10) Patent No.: US 11,710,219 B2
(45) Date of Patent: Jul. 25, 2023

(54) DETECTION AND REPLACEMENT OF TRANSIENT OBSTRUCTIONS FROM HIGH ELEVATION DIGITAL IMAGES

(71) Applicant: Mineral Earth Sciences LLC, Mountain View, CA (US)

(72) Inventors: Jie Yang, Sunnyvale, CA (US); Cheng-en Guo, Santa Clara, CA (US); Elliott Grant, Woodside, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 149 days.

(21) Appl. No.: 17/109,433

(22) Filed: Dec. 2, 2020

(65) Prior Publication Data

US 2021/0082133 A1 Mar. 18, 2021

Related U.S. Application Data

(63) Continuation of application No. 16/016,495, filed on Jun. 22, 2018, now Pat. No. 10,878,588.

(51) Int. Cl.
*G06T 5/00* (2006.01)
*G06T 7/33* (2017.01)
(Continued)

(52) U.S. Cl.
CPC ............ *G06T 5/005* (2013.01); *G06F 18/214* (2023.01); *G06F 18/241* (2023.01); *G06T 7/337* (2017.01);
(Continued)

(58) Field of Classification Search
USPC ................................ 382/157, 113, 254, 284
See application file for complete search history.

(56) References Cited

U.S. PATENT DOCUMENTS

| 4,683,496 A | 7/1987 | Tom |
| 5,612,901 A | 3/1997 | Gallegos et al. |

(Continued)

FOREIGN PATENT DOCUMENTS

| WO | 03069558 | 8/2003 |
| WO | 2016146641 | 9/2016 |

OTHER PUBLICATIONS

P. Singh and N. Komodakis, "Cloud-Gan: Cloud Removal for Sentinel-2 Imagery Using a Cyclic Consistent Generative Adversarial Networks," IGARSS 2018—2018 IEEE International Geoscience and Remote Sensing Symposium, Valencia, Spain, 2018, pp. 1772-1775. (Year: 2018).*

(Continued)

*Primary Examiner* — Kathleen Y Dulaney
(74) *Attorney, Agent, or Firm* — Gray Ice Higdon

(57) ABSTRACT

Implementations relate to detecting/replacing transient obstructions from high-elevation digital images. A digital image of a geographic area includes pixels that align spatially with respective geographic units of the geographic area. Analysis of the digital image may uncover obscured pixel(s) that align spatially with geographic unit(s) of the geographic area that are obscured by transient obstruction(s). Domain fingerprint(s) of the obscured geographic unit(s) may be determined across pixels of a corpus of digital images that align spatially with the one or more obscured geographic units. Unobscured pixel(s) of the same/different digital image may be identified that align spatially with unobscured geographic unit(s) of the geographic area. The unobscured geographic unit(s) also may have domain fingerprint(s) that match the domain fingerprint(s) of the obscured geographic unit(s). Replacement pixel data may be calculated based on the unobscured pixels and used to
(Continued)

generate a transient-obstruction-free version of the digital image.

10 Claims, 7 Drawing Sheets

(51) Int. Cl.
    *G06V 20/10*           (2022.01)
    *G06F 18/214*         (2023.01)
    *G06F 18/241*         (2023.01)

(52) U.S. Cl.
    CPC ............ *G06T 7/344* (2017.01); *G06V 20/188* (2022.01); *G06T 2207/10036* (2013.01); *G06T 2207/10041* (2013.01); *G06T 2207/20081* (2013.01); *G06T 2207/30188* (2013.01)

(56) References Cited

U.S. PATENT DOCUMENTS

| | | | |
|---|---|---|---|
| 7,558,433 | B1 | 7/2009 | Georgiev |
| 8,184,865 | B2 | 5/2012 | Sasakawa |
| 8,509,476 | B2 | 8/2013 | Amin et al. |
| 8,594,375 | B1 | 11/2013 | Padwick |
| 9,230,308 | B2* | 1/2016 | Ma .......................... G06T 5/50 |
| 9,367,743 | B1 | 6/2016 | Haglund et al. |
| 10,878,588 | B2 | 12/2020 | Yang |
| 2002/0096622 | A1 | 7/2002 | Adler-Golden et al. |
| 2005/0171754 | A1* | 8/2005 | Santodomingo ........ G06T 17/05 703/21 |
| 2005/0175253 | A1 | 8/2005 | Li et al. |
| 2009/0003702 | A1 | 1/2009 | Ofek et al. |
| 2009/0110239 | A1 | 4/2009 | Chen et al. |
| 2011/0064280 | A1 | 3/2011 | Sasakawa |
| 2012/0314935 | A1 | 12/2012 | Cheng et al. |
| 2014/0064554 | A1 | 3/2014 | Coulter et al. |
| 2014/0212055 | A1* | 7/2014 | Boriah ................... G06V 20/13 382/224 |
| 2015/0071528 | A1 | 3/2015 | Marchisio et al. |
| 2017/0140245 | A1* | 5/2017 | Kraft ..................... G06F 18/214 |
| 2017/0161584 | A1 | 6/2017 | Guan et al. |
| 2017/0169544 | A1 | 6/2017 | Boulkenafed et al. |
| 2017/0213109 | A1 | 7/2017 | Moody et al. |
| 2018/0176531 | A1* | 6/2018 | Liu .......................... G06T 5/50 |
| 2018/0232900 | A1 | 8/2018 | Kraft et al. |
| 2019/0005330 | A1 | 1/2019 | Uhlenbrock et al. |
| 2019/0108384 | A1* | 4/2019 | Wang ..................... G06V 20/49 |
| 2019/0251665 | A1 | 8/2019 | Kaneko |
| 2020/0065946 | A1 | 2/2020 | Nagare et al. |
| 2021/0133936 | A1* | 5/2021 | Chandra ................... G06T 5/50 |

OTHER PUBLICATIONS

C. Grohnfeldt, M. Schmitt and X. Zhu, "A Conditional Generative Adversarial Network to Fuse Sar and Multispectral Optical Data for Cloud Removal From Sentinel-2 Images," IGARSS 2018—2018 IEEE International Geoscience and Remote Sensing Symposium, Valencia, Spain, 2018, pp. 1726-1729. (Year: 2018).*

Candra, D. et al., "Cloud and Cloud Shadow Removal of Landsat 8 Images Using Multi-Temporal Cloud Removal Method;" 6th International Conference on Agro-Geoinformatics; 5 pages; 2017.

Saranya, M.; Cloud Removal from Satellite Images Using Information Cloning; IJCSMC; vol. 3:2; pp. 681-688; dated Feb. 2014.

Chen, B. et al., "Spatially and Temporally Weighted Regression: A Novel Method to Produce Continuous Cloud-Free Landsat Imagery;" IEEE Transactions on Geoscience and Remote Sensing; vol. 55, No. 1, pp. 27-37; 2017.

Mohajerani, S. et al., A Cloud Detection Algorithm for Remote Sensing Images Using Fully Convolutional Neural Networks, arXiv.org, arXiv:1810.05782v1, 5 pages, Oct. 13, 2018.

Ozkan, S. et al., "Cloud Detection from RGB Color Remote Sensing Images with Deep Pyramid Networks," arXiv.org, arXiv:1801.08706v1, 4 pages, Jan. 26, 2018.

Wang, B. et al., "Automated Detection and Removal of Clouds and Their Shadows from Landsat TM Images"; retrieved from internet: URL:http://citeseerx.ist.psu.edu/viewdoc/download?doi=10.1.1.29.7449&rep=rep1&type=pdf; 8 pages; 1999.

Shaw, G. et al., "Spectral Imaging for Remote Sensing"; Lincoln Laboratory Journal; retrieved from internet: URL: https://www.11.mit.edu/publications/journal/pdf/vol14_no1/14_1remotesensing.pdf; 26 pages; 2003.

European Patent Office; International Search Report and Written Opinion of Ser. No. PCT/US2019/038528; 15 pages; dated Oct. 4, 2019.

Chandran, G. et al; A Survey of Cloud Detection Techniques for Satellite Images; IRJET; vol. 02:9; pp. 2485-2490; dated Dec. 2015.

Demir, Ugur et al.; Patch-Based Image Inpaiting with Generative Adversarial Networks; 28 pages; dated Mar. 2018.

Enomoto, et al.; Filmy Cloud Removal on Satellite Imagery with Multispectral Conditional Generative Adversarial Nets; 9 pages; dated Oct. 2017.

Gao, et al.; Removal of Thin Cirrus Scattering Effects in Landsat 8 OLI Images Using the Cirrus Detecting Channel; Remote Sensing; pp. 1-10; dated Aug. 2017.

Harris, et al.; Real-Time Cloud Rendering; Eurographics; vol. 20:3; 9 pages; dated 2001.

He, K. et al.; Single Image Haze Removal Using Dark Channel Prior; IEEE; vol. 33:12; pp. 2341-2353; dated Dec. 2011.

Isola, Phillip et al.; Image-to-Image Translation with Conditional Adversarial Networks; CVPR; pp. 1125-1134; dated 2017.

Jacob, Annie et al.; Cloud Removal from Satellite Using Cloning Method; IJRCCT; pp. 101-104; dated Mar. 2016.

AP, Jasna et al.; A Multitemporal Approach for Cloud Removal from Satellite Images; IJCTER; vol. 2:5; pp. 224-232; dated May 2016.

Jiwoong, Daniel et al.; Generating Images with Recurrent Adversarial Neworks; 20 pages; dated Dec. 2016.

Koren, Yehuda et al.; Matrix Factorization Techniques for Recommender Systems; pp. 42-49; dated Aug. 2009.

Li, Chuan et al.; Precomputed Real-Time Texture Systhesis with Markovian Generative Adversarial Networks; Institut for Informatik; University of Mainz; pp. 1-17; dated Apr. 2016.

Liu, Guilin et al.; Image Inpaiting for Irregular Holes Using Partial Convolutions; NVIDIA Corporation; p. 1-23; dated Apr. 2018.

Liu, Jun et al.; Thin Cloud Removal from Single Satellite Images; Optical Society of America; pp. 618-632; dated 2014.

Meng, Xuelian et al.; Ground Filtering Algorithms for Airborne LiDAR Data: A Review of Critical Issues; Remote Sensing; pp. 833-860; dated Mar. 2010.

Mutyauvyu, Maithya; Developing a Cloud Removal Tool by Combining Optical and Microwave ALOS Data; School of Engineering; University of Nairobi; 72 pages; dated 2017.

Ramya, P. et al.; Cloud Removal in High Resolution Satellite Images Using Discrete Wavelet Transform; IJIACS; vol. 3:2; pp. 16-21; dated Apr. 2014.

Reinartz, Peter et al.; Cirrus Removal in Multispectral Datawithout 1.38uM Spectai Data; ResearchGate; p. 40-44; dated Jun. 2016.

Ronneberger, Olaf et al.; U-Net: Convolutional Networks for Biomedical Image Segmentation; University of Freiburg; pp. 1-8; dated May 2015.

Sofman, Boris et al.; Terrain Classification from Aerial Data to Support Ground Vehicle Navigation; Robotics Institute Carnegie Mellon University; 6 pages; dated 2006.

Sucharita, Soumya et al.; Cloud Removal Using Multi-Temporal Satellite Images and Fuzzy Logic; IJSER; vol. 6:9; pp. 57-60; dated Sep. 2015.

Tahsin, Subrina et al.; Optical Cloud Pixel Recovery via Machine Learning; Remote Sensing; pp. 1-19; dated May 2017.

Gao, Bo-Cai et al.; Development of an Algorithm for Removing Thin Cirrus Scattering Effects in Landsat 8 OLI Data Using AVIRIS-Classic; Naval Search Laboratory; 27 pages; dated Oct. 2017.

Canadian Intellectual Property Office; Examination Report issued in Application No. 3,104,652, 3 pages, dated Dec. 31, 2021.

(56) References Cited

OTHER PUBLICATIONS

Canadian Intellectual Property Office; Commissioner's Notice of Allowability issued for Application No. 3104652, 1 page, dated Jan. 31, 2023.
Zhengke, Gui et al.; Automatic Cloud and Cloud Shadow Removal Method for Landsat TM Images; ICEMI; pp. 80-84; dated 2011.
Brazilian Patent Office; Office Action issued in Application No. BR112020026354-0; 10 pages; dated Mar. 30, 2023.

\* cited by examiner

DETECTION AND REPLACEMENT OF TRANSIENT OBSTRUCTIONS FROM HIGH ELEVATION DIGITAL IMAGES

BACKGROUND

Digital images captured from high elevations, such as satellite images, images captured by unmanned aerial vehicles, manned aircraft, or images captured by high elevation manned aircraft (e.g., space shuttles), are useful for a variety of purposes. For example, it is beneficial to observe crop fields over time for purposes of agricultural monitoring/planning. Other useful applications of high-elevation digital imagery include, but are not limited to, city planning, reservoir monitoring, environmental monitoring, surveillance, reconnaissance, and so forth.

One challenge of high-elevation digital imagery is that 30-60% of such images tend to be covered by clouds, shadows, haze and/or snow (for simplicity, these will all be referred to herein as "transient obstructions"), depending on the location and time. Transient obstructions such as clouds make high-elevation digital images less useful, reduce their business and scientific value, and/or decrease the user experience with applications that rely on high-elevation digital images. For example, clouds introduce gaps in observations made during agricultural monitoring, potentially leaving key information such as germination or harvest dates unavailable for use.

SUMMARY

The present disclosure is generally directed to methods, apparatus, and computer-readable media (transitory and non-transitory) for detecting and removing noise caused by transient obstructions such as clouds from high-elevation digital images of geographic areas, and for predicting/estimating ground features and/or terrain obstructed by transient obstructions. In various implementations, high-elevation digital image pixel data acquired across multiple domains, such as the temporal domain (i.e., multiple digital images captured over time), the spatial domain, and/or the spectral domain (e.g., RGB, infrared, etc.), may be used to predict or estimate data that can be used to replace pixels that depict transient obstructions such as clouds.

In some implementations, pixels of high-elevation digital images may correspond or align spatially with atomic geographic units. For example, if a vision sensor used to capture high-elevation digital images has a resolution of N meters squared per pixel, then each geographic unit may be defined as an area of N meters squared. In other implementations in which fidelity is less critical, multiple pixels may be used to define an atomic geographic unit. Thus, in multiple high-elevation digital images captured of a geographic area over time, a given pixel may align spatially with a given geographic unit in each image.

In some implementations, patterns or "fingerprints" within individual domains and/or across multiple domains may be established for individual geographic units. These fingerprints may be used to identify other geographic units that would most likely have similar appearances in a digital image, assuming those other geographic units are not obscured by clouds. As an example, suppose a particular geographic unit is obscured by clouds in a given high-elevation digital image. An unobscured geographic unit in the same digital image or another related digital image (e.g., taken nearby, taken within the same time interval, taken of the same type of crop, etc.) that matches one or more domain fingerprints of the particular geographic unit may be used to predict/estimate data that is usable to replace the obscured pixel.

As used herein, a domain fingerprint of one geographic unit "matches" a domain fingerprint of another geographic unit when, for example, a similarity measure between the two fingerprints satisfies some threshold, and/or when a Euclidian distance between latent embeddings of the fingerprints satisfies some criterion. Thus, it should be understood that the term "match" as used herein with regard to domain fingerprints is not limited to exact equality. As another example, two domain fingerprints may match when, for instance, they both can be fitted statistically with the same curve, or when they are used to generate curves that fit each other statistically.

High-elevation digital images are often taken of a geographic area over time. For example, many satellites capture multiple temporally-distinct digital images of the same underlying geographic area as they repeatedly travel along their orbital trajectories. Due to the transient nature of clouds and other transient obstructions, each digital image of the particular geographic region may have different areas that are obscured or unobscured by natural obstructions such as clouds. Some implementations described herein leverage these multi-temporal images to predict values of obscured pixels in individual digital images.

For example, in some implementations, a three-dimensional ("3D") array structure may be assembled in memory for a geographic area based on multiple digital images captured of the geographic area. Each row of the 3D array may represent a particular pixel (and spatially corresponding geographic unit). Each column of the array may correspond to, for instance, a different digital image captured at a different time (e.g., during each orbit of a satellite). And in some implementations, each unit in the third dimension of the 3D array—which can be referred to alternatively as "layers," "pages," and/or "aisles"—may correspond to a different spectral frequency, such as red, green, blue, near infrared ("IR"), mid-IR, far-IR, thermal IR, and/or radar.

Once this 3D array is assembled for a particular geographic area, it can be used to remove transient obstructions such as clouds from individual digital images. For example, in some implementations, clouds or other noise may leave "gaps" in one or more "cells" of the 3D array. The 3D array can be applied as input to one or more statistical models so that the gaps can be filled with replacement data, e.g., from other cells of the 3D array. In some such implementations, the 3D array structure may continue to grow as more digital images are captured over time. Consequently, the ability to fill in the gaps and replace clouds with predicted terrain data may be enhanced over time.

Various approaches can be applied to determine whether cells of the 3D array structure represent transient obstructions (or other noise). In some implementations, existing/known masks associated with clouds, haze, snow, shadows, etc. may be packaged with high-elevation digital images. Additionally or alternatively, in some implementations, an artificial intelligence model may be trained to detect clouds—in some cases it may be tuned to be high recall so that, for instance, it is unlikely to miss potential clouds. Additionally or alternatively, in some implementations, one or more models (e.g., two models) may be trained to perform both cloud detection and removal. For example, a model may be trained to, based on an input high-elevation digital image, predict a cloud mask and remove the clouds.

In some implementations, recurrent neural networks or other memory networks (e.g., long short-term memory, or "LSTM") that are able to account for multi-temporal input may be used to fill in the gaps in the 3D array structure. For example, in some implementations, each spatio-spectral "slice" of the 3D array structure (i.e., data extracted from each digital image of multiple digital images captured over time) may be applied as input across a recurrent neural network to generate output. This output may be combined (e.g., concatenated) with a "next" slice of the 3D array structure and applied as input across the same recurrent neural network to generate additional output. This may continue across a whole temporal sequence of digital images captured of a geographic area. At each turn, the output may "predict" what the next slice will look like. When the next slice in actuality includes transient obstruction(s) such as clouds, the predicted output can be used to generate replacement data for the pixels that portray the transient obstruction(s).

In some implementations, the domain fingerprints described previously may be used to classify individual geographic units into particular terrain classifications. These terrain classifications may include, for instance, roadways, buildings, water, vegetation, etc. In some implementations, e.g., in which disclosed techniques are used for agricultural monitoring, terrain classifications may include ground features such as different types of crops (e.g., "corn," "soybeans," etc.), and may be as granular as desired. For example, in some implementations, the Cropland Data Layer ("CDL") released by the United States Department of Agriculture ("USDA") may be used to establish terrain classifications associated with different crop types. In some such implementations, geographic units may be classified into terrain classifications using a trained machine learning model, such as various flavors of artificial neural networks (e.g., convolutional, recurrent, etc.). In some implementations, two or more geographic units may "match" if they share a particular terrain classification.

A variety of different machine learning model types may be trained and used for a variety of different purposes in the present disclosure. In some implementations, one or more generative adversarial networks ("GANs") may be used to facilitate unsupervised machine learning for various aspects of the present disclosure. For example, in some implementations, synthetic transient obstructions such as clouds (and shadows they cast on the ground) may be added to otherwise obstruction-free ground truth high-elevation digital images. These "synthetic images may then be used, e.g., along with the original unaltered high-elevation images, as training data for a GAN that includes a generator model and a discriminator model. The generator model may be used to generate synthetic images (i.e., with synthetic transient obstructions), which are then applied as input across the discriminator model to generate output comprising a best "guess" as to whether the input digital image(s) are "real" or "synthetic." The input for the discriminator model may be labeled as "real" or "synthetic," so that these labels may be compared to its output to determine error. This error may then be used to train both the discriminator model and the generator model, so that over time the generator model generates synthetic images that are more likely to "fool" the discriminator model, while the discriminator model improves at accurately guessing whether an image is "real" or "synthetic."

Similarly, transient obstructions such as clouds may be removed/replaced in high-elevation digital imagery using another GAN that also includes a generator model and a discriminator model. High-elevation digital image(s) with transient obstruction(s) may be applied as input across the generator model to generate output in the form of synthetic, obstruction-free digital image(s). The synthetic, obstruction-free digital image(s) may then be applied as input across the discriminator model, along with obstruction-free ground truth high-elevation digital images, to generate output comprising a best "guess" as to whether the digital image(s) are "real" or "synthetic." As described previously, the inputs for the discriminator model may be labeled as "real" or "synthetic," and these labels may be compared to its output to determine error. This error may then be used to train both the discriminator model and the generator model, so that over time the generator model generates synthetic, obstruction-free images that are more likely to "fool" the discriminator model, while the discriminator model improves at accurately guessing whether an image is "real" or "synthetic."

High elevation digital image may be captured in a variety of ways. As noted previously, in various implementations, one or more satellites may traverse an orbit and continuously/periodically capture high elevation images of the same sequence of geographic areas. Additionally or alternatively, in some implementations, high elevation digital images may be captured by unmanned aerial vehicles, such as remote controlled drones. Additionally or alternatively, in some implementations, high elevation digital images may be captured using other mechanisms, including but not limited to manned aircraft, balloons, spacecraft, and so forth.

In some implementations, a computer implemented method may be provided that includes the following operations: obtaining a digital image of a geographic area captured from an elevated vantage point, wherein the digital image comprises a plurality of pixels that align spatially with a respective plurality of geographic units of the geographic area; identifying one or more obscured pixels of the digital image that align spatially with one or more obscured geographic units of the geographic area that are obscured in the digital image by one or more transient obstructions; determining, across pixels of a corpus of digital images that align spatially with the one or more obscured geographic units, one or more spectral-temporal data fingerprints of the one or more obscured geographic units; identifying one or more unobscured pixels of the same digital image or a different digital image that align spatially with one or more unobscured geographic units that are unobscured by transient obstructions, wherein the unobscured geographic units have one or more spectral-temporal data fingerprints that match the one or more spectral-temporal data fingerprints of the one or more obscured geographic units; calculating replacement pixel data based on the one or more unobscured pixels; and generating a transient-obstruction-free version of the digital image in which data associated with the one or more obscured pixels is replaced with the replacement pixel data.

This method and other implementations of technology disclosed herein may each optionally include one or more of the following features.

In various implementations, the digital image may be captured by a satellite, and the elevated vantage point lies on a trajectory of the satellite. In various implementations, the digital image may be captured by an unmanned aerial drone or manned aircraft, and the elevated vantage point may lie on a trajectory of the unmanned aerial drone or manned aircraft. In various implementations, the one or more spectral-temporal data fingerprints of the one or more obscured geographic units may include infrared, panchromatic, RGB, etc.

In various implementations, the method may further include applying the one or more spectral-temporal data fingerprints of the one or more obscured geographic units across a trained machine learning model to determine a terrain classification of the one or more obscured geographic units. In some such implementations, identifying one or more unobscured pixels may include determining that the terrain classification of the one or more obscured geographic units matches a terrain classification of the one or more unobscured geographic units.

In various implementations, the operations of determining, identifying, and calculating collectively may include sequentially applying data indicative of each digital image of the corpus of digital images as input across a recurrent neural network. In various implementations, the calculating may be based at least in part on application of a generator model, and wherein the generator model is part of a generative adversarial network that also includes a discriminator model that is trained in conjunction with the generator model. In various implementations, the generator model and the discriminator model may be trained using at least one training example that takes the form of a high elevation digital image with synthetic transient obstructions added, wherein the synthetic transient obstructions are added by a transient obstruction generation model that is trained as part of another generative adversarial network.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
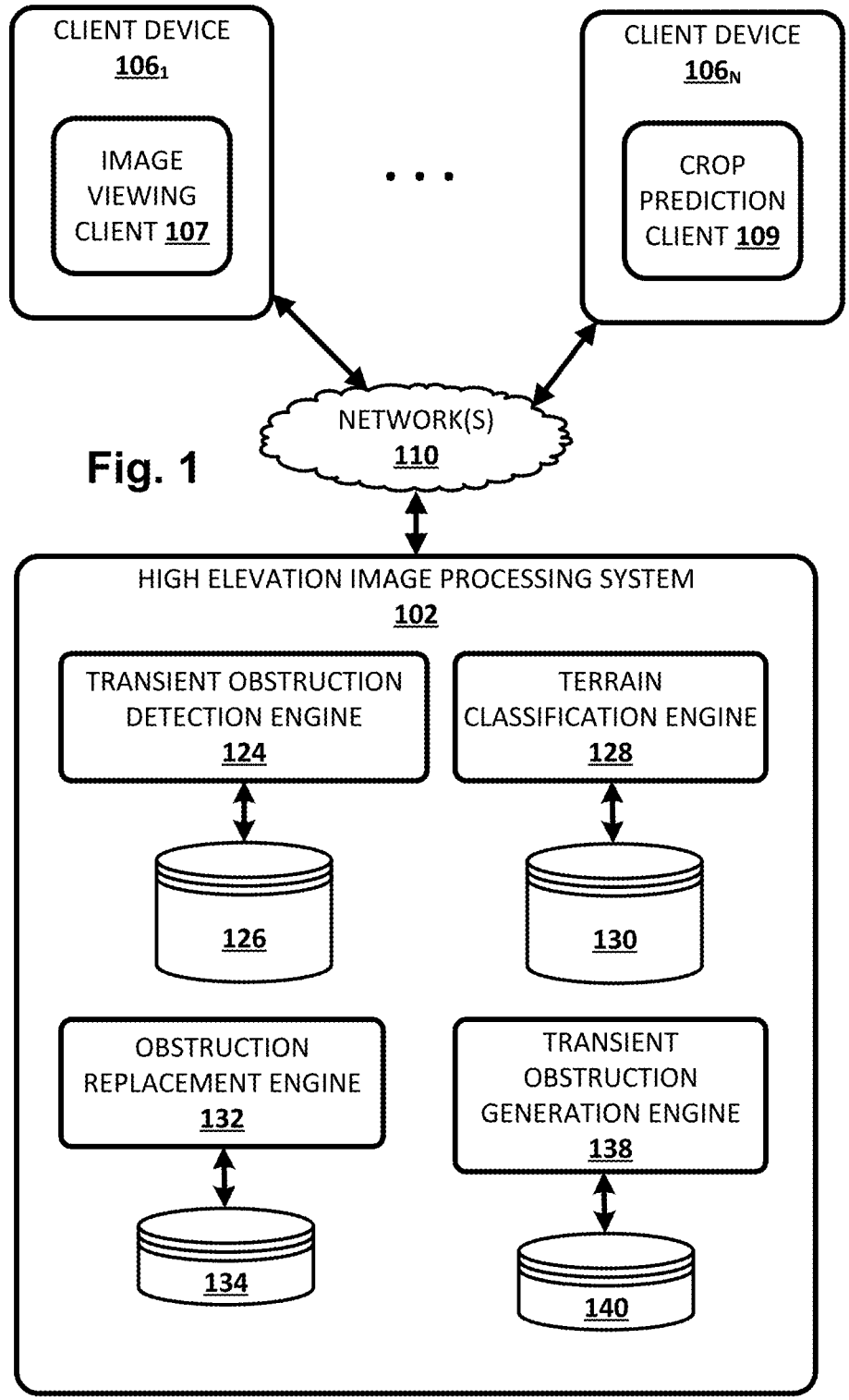
FIG. 1 illustrates an example environment in selected aspects of the present disclosure may be implemented, in accordance with various implementations.

FIG. 1 illustrates an environment in which one or more selected aspects of the present disclosure may be implemented, in accordance with various implementations. The example environment includes a plurality of client devices $106_{1-N}$ and a high elevation image processing system 102. High elevation image processing system 102 may be implemented in one or more computers that communicate, for example, through a network. High elevation image processing system 102 is an example of an information retrieval system in which the systems, components, and techniques described herein may be implemented and/or with which systems, components, and techniques described herein may interface.

A user may interact with high elevation image processing system 102 via a client device 106. Each client device 106 may be a computer coupled to the high elevation image processing system 102 through one or more networks 110 such as a local area network (LAN) or wide area network (WAN) such as the Internet. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus of the participant that includes a computing device (e.g., a watch of the participant having a computing device, glasses of the participant having a computing device). Additional and/or alternative client devices may be provided.

Each of client device 106 and high elevation image processing system 102 may include one or more memories for storage of data and software applications, one or more processors for accessing data and executing applications, and other components that facilitate communication over a network. The operations performed by client device 106 and/or high elevation image processing system 102 may be distributed across multiple computer systems. High elevation image processing system 102 may be implemented as, for example, computer programs running on one or more computers in one or more locations that are coupled to each other through a network.

Each client device 106 may operate a variety of different applications that may be used, for instance, to view high-elevation digital images that are processed using techniques described herein to remove transient obstructions such as clouds, shadows (e.g., cast by clouds), snow, manmade items (e.g., tarps draped over crops), etc. For example, a first client device $106_1$ operates an image viewing client 107 (e.g., which may be standalone or part of another application, such as part of a web browser). Another client device $106_N$ may operate a crop prediction application 109 that utilizes high-elevation digital images processed using techniques described herein to make various agricultural predictions and/or recommendations.

In various implementations, high elevation image processing system 102 may include a transient obstruction detection engine 124, a terrain classification engine 128, an obstruction replacement engine 132, and a transient obstruction generation engine 138. In some implementations one or more of engines 124, 128, 132, and/or 138 may be omitted. In some implementations all or aspects of one or more of engines 124, 128, 132, and/or 138 may be combined. In some implementations, one or more of engines 124, 128, 132, and/or 138 may be implemented in a component that is separate from high elevation image processing system 102. In some implementations, one or more of engines 124, 128, 132, and/or 138, or any operative portion thereof, may be implemented in a component that is executed by client device 106.

Transient obstruction detection engine 124 may be configured to detect, in high-elevation digital images, transient obstructions such as clouds, shadows cast by clouds, rain, haze, snow, flooding, and/or manmade obstructions such as tarps, etc. Transient obstruction detection engine 124 may employ a variety of different techniques to detect transient obstructions. For example, to detect clouds (e.g., create a cloud mask), transient obstruction detection engine 124 may use spectral and/or spatial techniques. In some implementations, one or more machine learning models may be trained and stored, e.g., in index 126, and used to identify transient obstructions. For example, in some implementations, one or more deep convolutional neural networks known as "U-nets" may be employed. U-nets are trained to segment images in various ways, and in the context of the present disclosure may be used to segment high elevation images into segments that include transient obstructions such as clouds. Additionally or alternatively, in various implementations, other known spectral and/or spatial cloud detection techniques may be employed, including techniques that either use, or don't use, thermal infrared spectral bands.

In some implementations, terrain classification engine 128 may be configured to classify individual pixels, or individual geographic units that correspond spatially with the individual pixels, into one or more "terrain classifications." Terrain classifications may be used to label pixels by what they depict. Non-limiting examples of terrain classifications include but are not limited to "buildings," "roads," "water," "forest," "crops," "vegetation," "sand," "ice," "mountain," "tilled soil," and so forth. Terrain classifications may be as coarse or granular as desired for a particular application. For example, for agricultural monitoring it may be desirable to have numerous different terrain classifications for different types of crops. For city planning it may be desirable to have numerous different terrain classifications for different types of buildings, roofs, streets, parking lots, parks, etc.

Terrain classification engine 128 may employ a variety of different known techniques to classify individual geographic units into various terrain classifications. Some techniques may utilize supervised or unsupervised machine learning that includes trained machine learning models stored, for instance, in index 130. These techniques may include but are not limited to application of multivariate statistics to local relief gradients, fuzzy k-means, morphometric parameterization and artificial neural networks, and so forth. Other techniques may not utilize machine learning.

In some implementations, terrain classification engine 128 may classify individual geographic units with terrain classifications based on trajectories or "fingerprints" of various domain values over time. For example, in some implementations, terrain classification engine 128 may determine, across pixels of a corpus of digital images captured over time, spectral-temporal data fingerprints of the individual geographic units corresponding to each individual pixel. Each fingerprint may include, for instance, a sequence of values within a particular spectral domain across a temporal sequence of digital images (e.g., a feature vector of spectral values).

As an example, suppose a particular geographic unit includes at least a portion of a deciduous tree. In a temporal sequence of satellite images of the geographic area that depict this tree, the pixel(s) associated with the particular geographic unit in the visible spectrum (e.g., RGB) will sequentially have different values as time progresses, with spring and summertime values being more green, autumn values possibly being orange or yellow, and winter values being gray, brown, etc. Other geographic units that also include similar deciduous trees may also exhibit similar domain trajectories, or fingerprints. Accordingly, in various implementations, the particular geographic unit and/or other similar geographic units may be classified, e.g., by terrain classification engine 128, as having a terrain classification such as "deciduous," "vegetation," etc., based on their matching spectral-temporal data fingerprints.

Obstruction replacement engine 132 may be configured to generate obstruction-free versions of digital images in which those pixels that depict clouds, snow, or other transient obstructions are replaced with replacement data that estimates/predicts the actual terrain that underlies these pixels. Obstruction replacement engine 132 may use a variety of different techniques to generate transient-obstruction-free versions of digital images.

For example, in some implementations, obstruction replacement engine 132 may be configured to determine, e.g., based on output provided by transient obstruction detection engine 124, one or more obscured pixels of a high-elevation digital image that align spatially with one or more obscured geographic units of the geographic area that are obscured in the digital image by one or more transient obstructions. Obstruction replacement engine 132 may then determine, e.g., across pixels of a corpus of digital images that align spatially with the one or more obscured geographic units, one or more spectral-temporal data fingerprints of the one or more obscured geographic units. For example, in some implementations, terrain classification engine 128 may classify two or more geographic units having matching spectral-temporal fingerprints into the same terrain classification.

Obstruction replacement engine 132 may then identify one or more unobscured pixels of the same high-elevation digital image, or of a different high elevation digital image that align spatially with one or more unobscured geographic units that are unobscured by transient obstructions. In various implementations, the unobscured geographic units may be identified because they have spectral-temporal data fingerprints that match the one or more spectral-temporal data fingerprints of the one or more obscured geographic units. For example, obstruction replacement engine 132 may seek out other pixels of the same digital image or another digital image that correspond to geographic units having the same (or sufficiently similar) terrain classifications.

In various implementations, obstruction replacement engine 132 may calculate or "harvest" replacement pixel data based on the one or more unobscured pixels. For example, obstruction replacement engine may take an average of all values of the one or more unobscured pixels in a particular spectrum and use that value in the obscured pixel. By performing similar operations on each obscured pixel in the high-elevation digital, obstruction replacement engine 132 may be able to generate a transient-obstruction-free version of the digital image in which data associated with obscured pixels is replaced with replacement pixel data calculated based on other, unobscured pixels that depict similar terrain (e.g., same terrain classification, matching spectral-temporal fingerprints, etc.).

In some implementations, obstruction replacement engine 132 may employ one or more trained machine learning models that are stored in one or more indexes 134 to generate obstruction-free versions of digital images. A variety of different types of machine learning models may be employed. For example, in some implementations, collaborative filtering and/or matrix factorization may be employed, e.g., to replace pixels depicting transient obstructions with pixel data generated from other similar-yet-unobscured pixels, similar to what was described previously. In some implementations, matrix factorization techniques such as the following equation may be employed:

$$\hat{r}_{ui} = \mu + b_i + b_u + q_i^T p_u$$

wherein r represents the value of a pixel in a particular band if it were not covered by clouds, $\mu$ represents global average value in the same band, b represents the systematic bias, i and u represent the pixel's id and timestamp, T represents matrix transpose, and q and p represent the low-dimension semantic vectors (or sometimes called "embeddings"). In some implementations, temporal dynamics may be employed, e.g., using an equation such as the following:

$$\hat{r}_{ui}(t) = \mu + b_i(t) + b_u(t) + q_i^T p_u(t)$$

wherein t represents a non-zero integer corresponding to a unit of time. Additionally or alternatively, in some implementations, generative adversarial networks, or "GANs," may be employed, e.g., by obstruction replacement engine 132, in order to train one or more models stored in index 134. A more detailed description of how GANs may be used in this manner is provided with regard to FIG. 3.

In some implementations, a transient obstruction generation engine 138 may be provided that is configured to generate synthetic obstructions such as clouds, snow, etc. that may be incorporated into digital images (e.g., used to augment, alter, and/or replace pixel values in one or more spectrums) for a variety of different purposes. In some implementations, digital images with baked-in synthetic transient obstructions may be used as training data to train one or more machine learning models used by other components of high elevation image processing system 102.

For example, in some implementations, a machine learning model employed by obstruction replacement engine 132 and stored in index 134 may be trained as follows. An obstruction-free (e.g., cloudless) high-elevation digital image of a geographic area may be retrieved. Based on the obstruction-free digital image, transient obstruction generation engine 138 may generate, e.g., using one or trained more machine learning models described below, a training example that includes the obstruction-free image with baked in synthetic transient obstructions such as clouds. This training example may be applied, e.g., by obstruction replacement engine 132, as input across one or more machine learning models stored in index 134 to generate output. The output may be compared to the original obstruction-free digital image to determine a difference or error. This error may be used to perform operations such as back propagation and/or gradient descent to train the machine learning model to remove transient obstructions such as clouds and replace them with predicted terrain data.

As another example, in some implementations, a machine learning model employed by transient obstruction detection engine 124 and stored in index 126 may be trained as follows. An obstruction-free (e.g., cloudless) high-elevation digital image of a geographic area may be retrieved. Based on the obstruction-free digital image, transient obstruction generation engine 138 may generate, e.g., using one or trained more machine learning models described below, a training example that includes the obstruction-free image with baked-in synthetic transient obstructions such as clouds. The location of the synthetic transient obstruction will be known because it is synthetic, and thus is available, e.g., from transient obstruction generation engine 138. Accordingly, in various implementations, the training example may be labeled with the known location(s) (e.g., pixels) of the synthetic transient obstruction. The training example may then be applied, e.g., by transient obstruction detection engine 124, as input across one or more machine learning models stored in index 134 to generate output indicative of, for instance, a cloud mask. The output may be compared to the known synthetic transient obstruction location(s) to determine a difference or error. This error may be used to perform operations such as back propagation and/or gradient descent to train the machine learning model to generate more accurate cloud masks.

Transient obstruction generation engine 138 may use a variety of different techniques to generate synthetic transient obstructions such as clouds. For example, in various implementations, transient obstruction generation engine 138 may use particle systems, voxel models, procedural solid noise techniques, density models (e.g., low albedo, single scattering approximation for illumination in a uniform medium), ray trace volume data, textured ellipsoids, isotropic single scattering approximation, Perlin noise with alpha blending, and so forth. In some implementations, transient obstruction generation engine 138 may use GANs to generate synthetic clouds, or at least to improve generation of synthetic clouds. More details about such an implementation are provided with regard to FIG. 4. Transient obstruction generation engine 138 may be configured to add synthetic transient obstructions to one or more multiple different spectral bands of a high-elevation digital image. For example, in some implementations transient obstruction generation engine 138 may add clouds not only to RGB spectral band(s), but also to NIR spectral band(s).

In this specification, the term "database" and "index" will be used broadly to refer to any collection of data. The data of the database and/or the index does not need to be structured in any particular way and it can be stored on storage devices in one or more geographic locations. Thus, for example, the indices 126, 130, 134, and 140 may include multiple collections of data, each of which may be organized and accessed differently.

Figure 2:
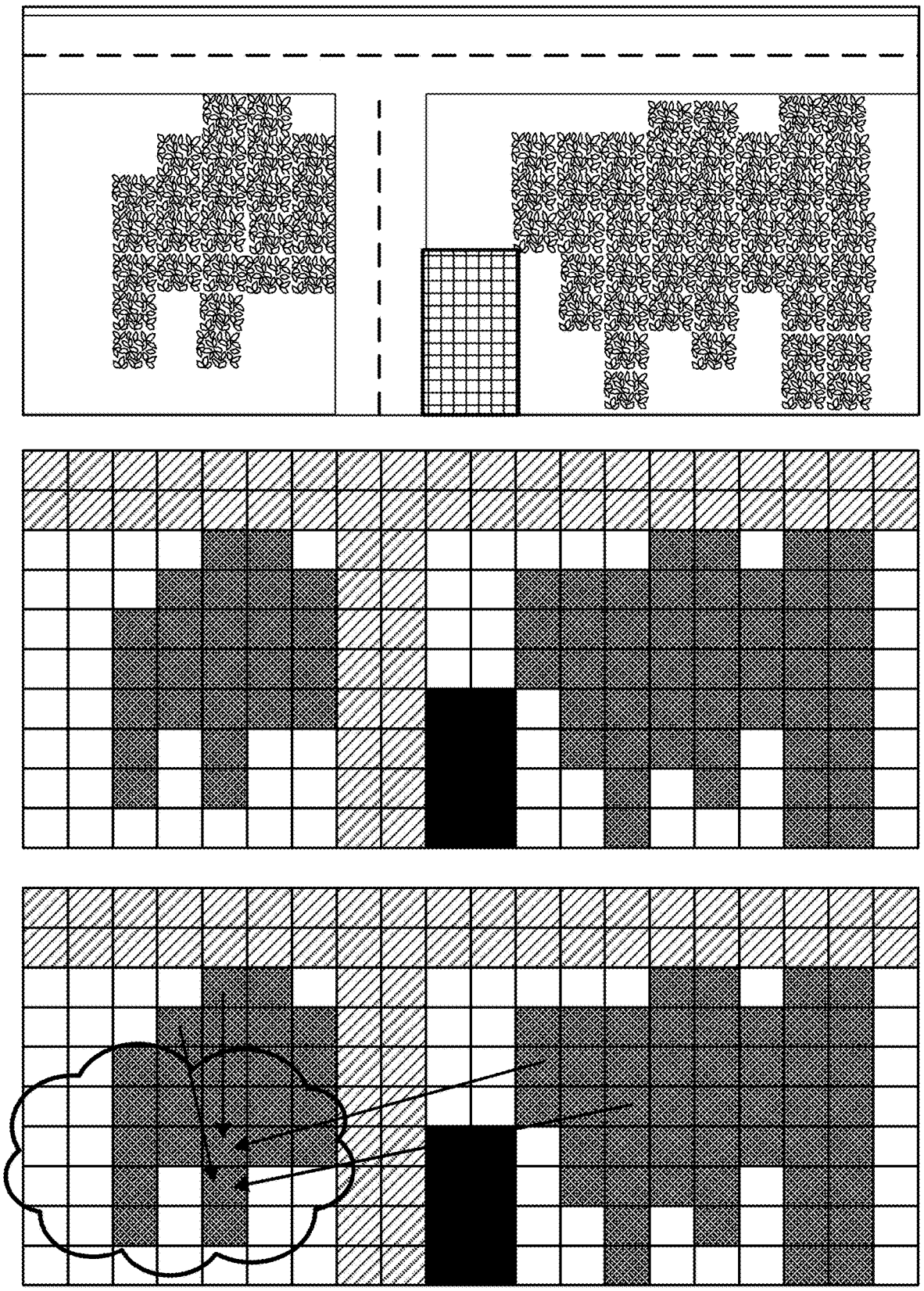
FIG. 2 depicts an example of how geographic units may be classified into terrain classifications, and how those terrain classifications can be used to generate replacement data for obscured pixels, in accordance with various implementations.

FIG. 2 depicts an example of how a ground truth high-elevation digital image (top) may be processed to classify the constituent geographic units that correspond to its pixels. In the top image, which schematically represents a high elevation digital image capturing a geographic area, a T-shaped road is visible that divides two plots of land at bottom left and bottom right. The bottom left plot of land includes a cluster of vegetation, and so does the bottom right plot. The bottom right plot also features a building represented by the rectangle with cross hatching.

The middle image demonstrates how the digital image at top may be classified, e.g., by terrain classification engine 128, into discrete terrain classifications, e.g., based on geographic units that share spectral-temporal fingerprints. The middle image is subdivided into squares that each represent a pixel that aligns spatially with a geographic unit of the top digital image. Pixels that depict roadway have been classified accordingly and are shown in a first shading.

Pixels that depict the building have also been classified accordingly and are shown in black. Pixels that represent the vegetation in the bottom left and bottom right plots of land are also classified accordingly in a second shading that is slightly darker than the first shading.

The bottom image demonstrates how techniques described herein, particularly those relating to terrain classification and/or spectral-temporal fingerprint similarity, may be employed to generate replacement data that predicts/estimates terrain underlying a transient obstruction in a high elevation digital image. In the bottom images of FIG. 2, a cloud has been depicted schematically primarily over the bottom left plot of land. As indicated by the arrows, two of the vegetation pixels (five columns from the left, three and four rows from bottom, respectively) that are obscured by the cloud can be replaced with data harvested from other, unobscured pixels. For example, data associated with the obscured pixel five columns from the left and three rows from bottom is replaced with replacement data that is generated from two other unobscured pixels: the pixel four columns from left and four rows from top, and the pixel in the bottom right plot of land that is five rows from bottom, seven columns from the right. Data associated with the obscured pixel five columns from the left and four rows from bottom is replaced with replacement data that is generated from two other unobscured pixels: the pixel five columns from left and three rows from top, and the pixel in the bottom right plot of land that is five rows from top and nine columns from the right.

Of course these are just examples. More or less unobscured pixels may be used to generate replacement data for obscured pixels. Moreover, it is not necessary that the unobscured pixels that are harvested for replacement data be in the same digital image as the obscured pixels. It is often (but not always) the case that the unobscured pixels may be contained in another high elevation digital image that is captured nearby, for instance, with some predetermined distance (e.g., within 90 kilometers). Or, if geographic units that are far away from each other nonetheless have domain fingerprints that are sufficiently similar, those faraway geographic units may be used to harvest replacement data.

Figure 3:
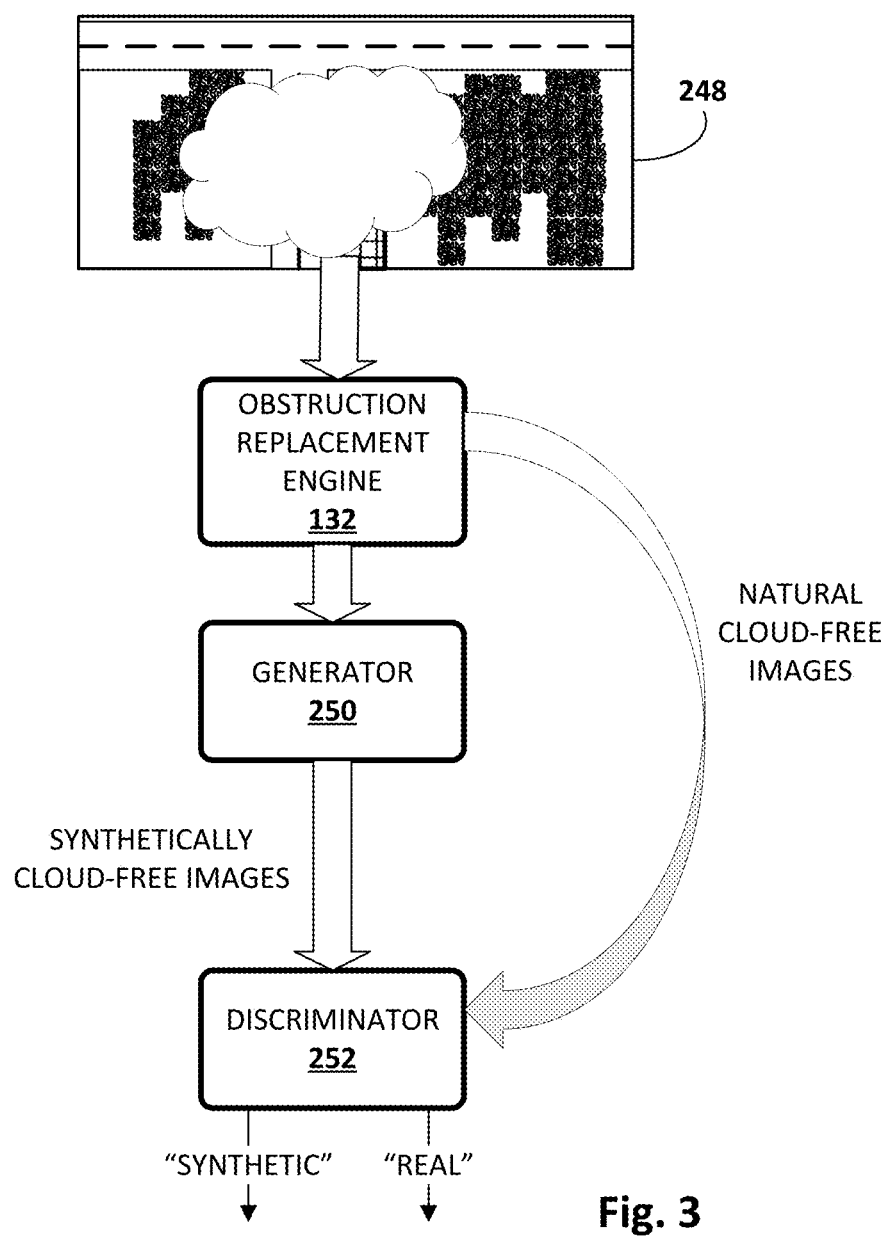
FIG. 3 depicts one example of how generative adversarial networks can be used to generate obstruction-free high-elevation digital images.

FIG. 3 depicts an example of how GANs may be used to train a generator model 250 employed by obstruction replacement engine 132, in accordance with various implementations. In various implementations, obstruction replacement engine 132 may retrieve one or more high elevation digital images 248 and apply them as input across generator model 250. Generator model 250 may take various forms, such as an artificial neural network. In some implementations, generator model 250 may take the form of a convolutional neural network.

Generator model 250 may generate output in the form of synthetically cloud-free (or more generally, transient obstruction-free) images. These images may then be applied as input across a discriminator model 252. Discriminator model 252 typically will take the same form as generator model 250, and thus can take the form of, for instance, a convolutional neural network. In some implementations, discriminator model 252 may generate binary output that comprises a "best guess" of whether the input was "synthetic" or "natural" (i.e., ground truth). At the same time, one or more natural, cloud-free (or more generally, transient obstruction-free) images (i.e., ground truth images) may also be applied as input across discriminator model 252 to generate similar output. Thus, discriminator model 252 is configured to analyze input images and make a best "guess" as to whether the input image contains synthetic data (e.g., synthetically-added clouds) or represents authentic ground truth data.

In various implementations, discriminator model 252 and generator model 250 may be trained in tandem, e.g., in an unsupervised manner. Output from discriminator model 252 may be compared to a truth about the input image (e.g., a label that indicates whether the input image was synthesized by generator 250 or is ground truth data). Any difference between the label and the output of discriminator model 252 may be used to perform various training techniques across both discriminator model 252 and generator model 250, such as back propagation and/or gradient descent, to train the models.

In other implementations, one or more recurrent neural networks or other memory networks (e.g., long short-term memory, or "LSTM") that are able to account for multi-temporal input may be used, e.g., by obstruction replacement engine 132, to generate replacement data that "fills in the gaps" as described in the summary. For example, in some implementations, each spatio-spectral "slice" of the 3D array structure described elsewhere herein (i.e., data extracted from each digital image of multiple digital images captured over time) may be applied as input across a recurrent neural network to generate output. This output may be combined (e.g., concatenated) with a "next" slice of the 3D array structure and applied, e.g., by obstruction replacement engine 132, as input across the same recurrent neural network to generate additional output. This may continue across a whole temporal sequence of digital images captured of a geographic area. At each turn, the output may "predict" what the next slice will look like. When the next slice in actuality includes transient obstruction(s) such as clouds, the predicted output can be used to generate replacement data for the obscured pixels.

Figure 4:
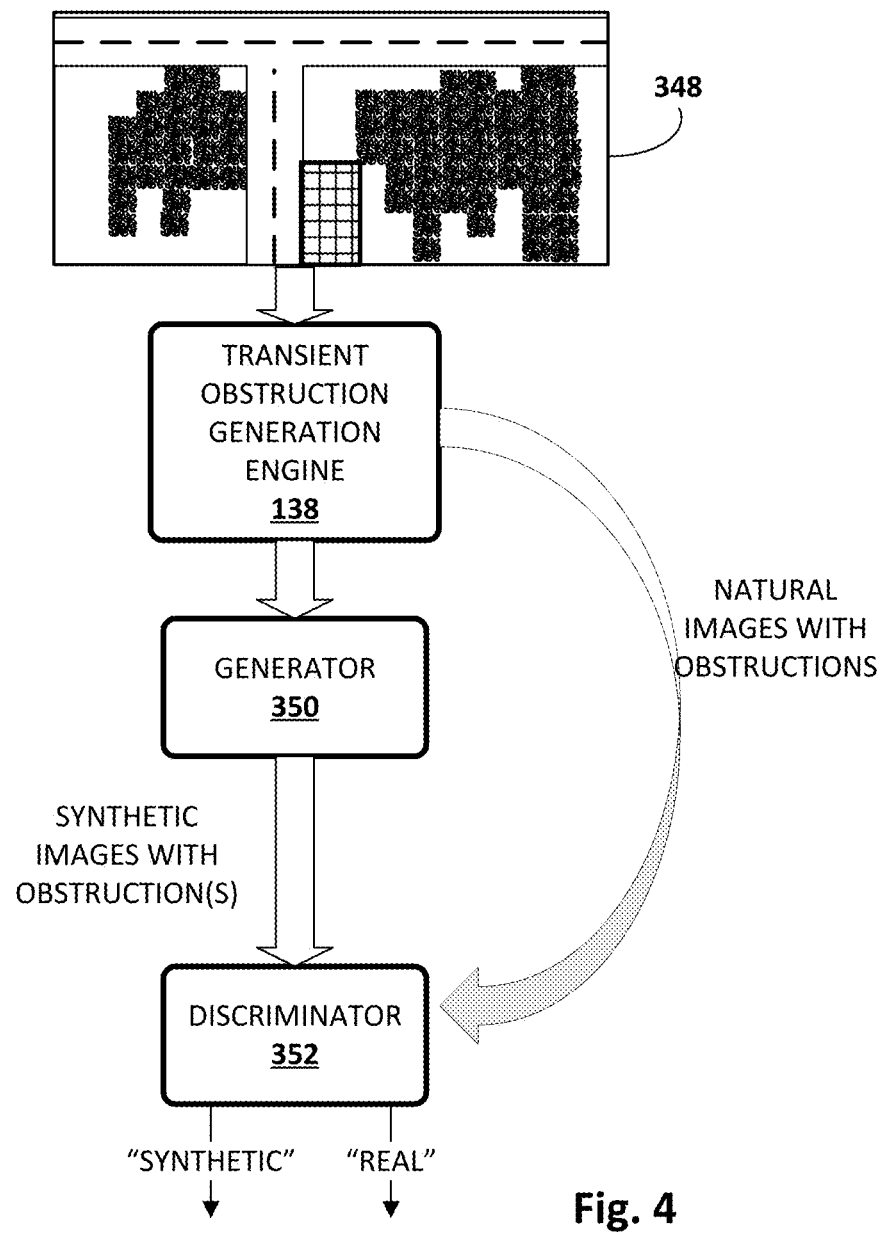
FIG. 4 depicts another example of how generative adversarial networks can be used to generate synthetic transient obstructions, e.g., for purposes of training various machine learning models described herein.

FIG. 4 schematically depicts an example of how GANs may be used to train one or more machine learning models employed by transient obstruction generation engine 138, in accordance with various implementations. Similar to FIG. 3, transient obstruction generation engine 138 may utilize a generator model 350 and a discriminator model 352, which may or may not take similar forms as models 250-252. In this example, transient obstruction generation engine 138 may retrieve one or more obstruction-free ground truth high-elevation digital images 348 and apply them as input across generator model 350 to generate synthetic images that include baked-in synthetic obstructions such as clouds. These synthetic images may then be applied as input across discriminator model 352, along with natural, ground truth images that also include obstructions. Similar to before, discriminator model 352 may be configured to generate output that constitutes a "guess" as to whether an input digital image is "synthetic" (e.g., generated by generator model 350) or "natural." These models 350-352 may be trained in a manner similar to that described above with regard to models 250-252.

Figure 5:
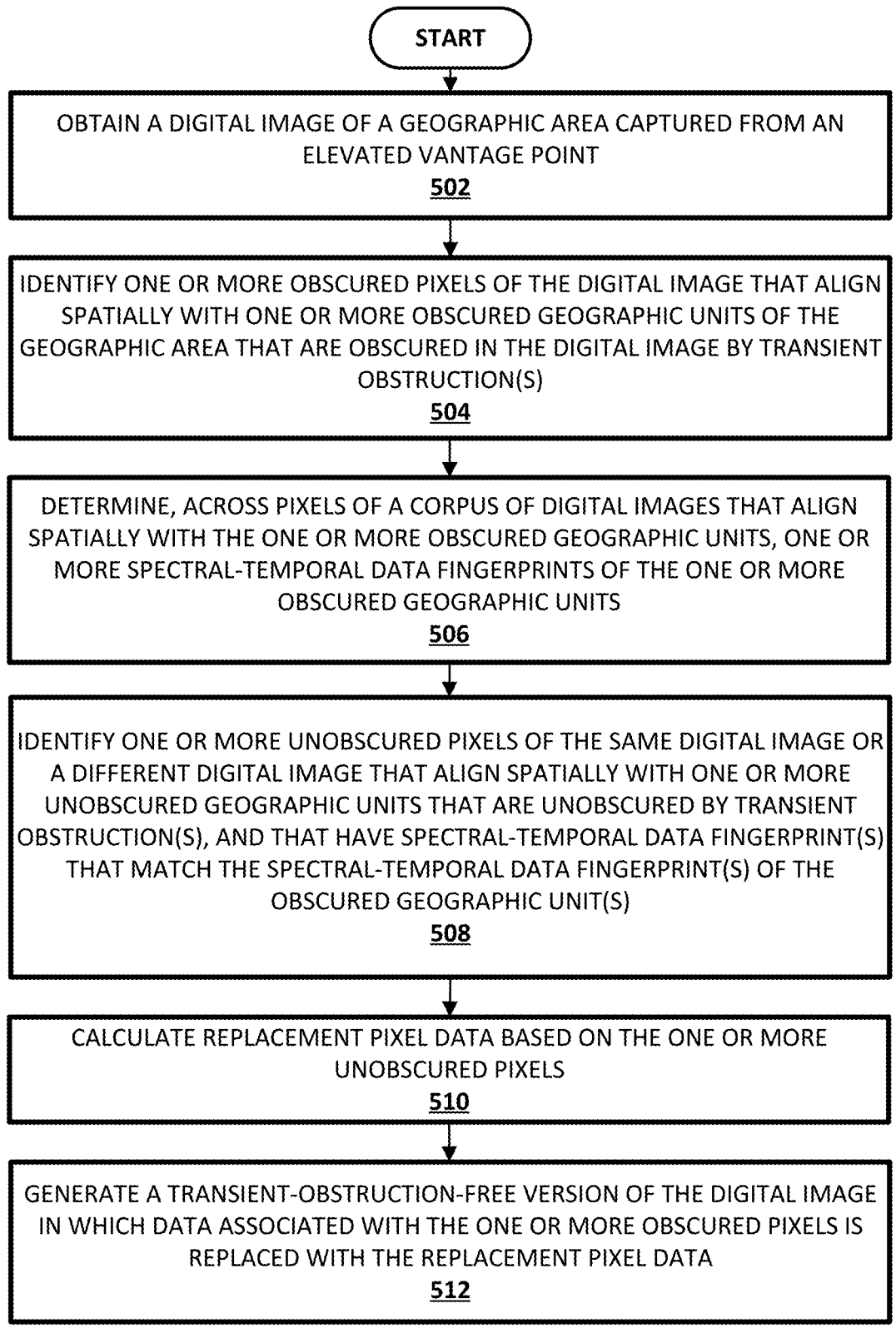
FIG. 5 depicts a flow chart illustrating an example method of practicing selected aspects of the present disclosure, in accordance with various implementations.

Referring now to FIG. 5, one example method 500 of performing selected aspects of the present disclosure is described. For convenience, the operations of the flow chart are described with reference to a system that performs the operations. This system may include various components of various computer systems, including various engines described herein. Moreover, while operations of method 500 are shown in a particular order, this is not meant to be limiting. One or more operations may be reordered, omitted or added.

At block 502, the system may obtain a digital image of a geographic area captured from an elevated vantage point. In various implementations, the digital image may include a plurality of pixels that align spatially with a respective plurality of geographic units of the geographic area.

At block 504, the system, e.g., by way of transient obstruction detection engine 124, may identify one or more obscured pixels of the digital image that align spatially with one or more obscured geographic units of the geographic area that are obscured in the digital image by one or more transient obstructions. Put another way, pixels that depict a portion of a cloud or other transient obstruction are identified, e.g., by transient obstruction detection engine 124 using one or more techniques described previously.

At block 506, the system, e.g., by way of terrain classification engine 128, may determine, across pixels of a corpus of digital images that align spatially with the one or more obscured geographic units, one or more spectral-temporal data fingerprints of the one or more obscured geographic units. For example, in some implementations, a ("3D") array structure may have been assembled previously for the geographic area, e.g., based on multiple digital images captured of the geographic area. Each row of the 3D array may represent a particular pixel (and spatially corresponding geographic unit). Each column of the array may correspond to, for instance, a different digital image captured at a different time. Each unit in the third dimension of the 3D array may correspond to different spectral frequencies that are available in the digital images, such as red, green, blue, near infrared ("IR"), mid-IR, far-IR, thermal IR, and/or radar. In various implementations, this 3D array structure may be used at block 306 to determine domain fingerprints, such as spectral-temporal fingerprints, of individual geographic units.

At block 508, the system, e.g., by way of obstruction replacement engine 132, may identify one or more unobscured pixels of the same digital image or a different digital image that align spatially with one or more unobscured geographic units of the same or different geographic area that are unobscured by transient obstructions. In various implementations, the unobscured geographic units may have one or more spectral-temporal data fingerprints that match the one or more spectral-temporal data fingerprints of the one or more obscured geographic units that were determined at block 506.

At block 510, the system may calculate replacement pixel data based on the one or more unobscured pixels. For example, an average of values across the unobscured pixels within a particular spectrum, or across multiple spectra, may be used. Additionally or alternatively, in some implementations, a single pixel that is "closest" (e.g., has a most similar domain fingerprint) to the unobscured pixel may simply be cloned into the obscured pixel. At block 512, the system may generate a transient-obstruction-free version of the digital image in which data associated with the one or more obscured pixels is replaced with the replacement pixel data.

Figure 6:
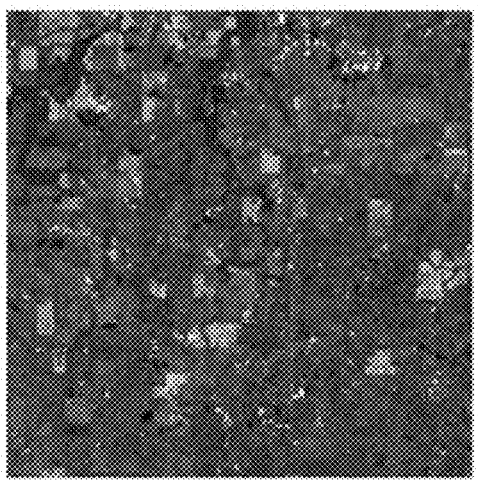
FIG. 6 depicts an example of how techniques described herein may be used to generate a transient-obstruction-free version of a high-elevation digital image that is at least partially obscured by transient obstruction(s).
Figure 6:
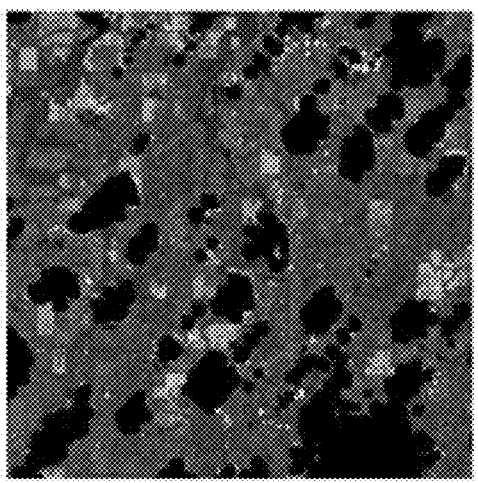
Figure 6:
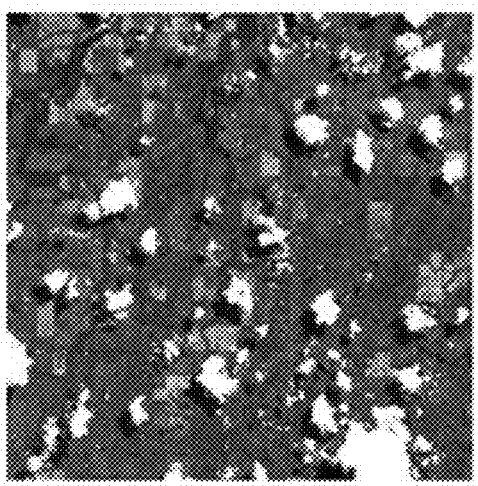

FIG. 6 depicts an example of how techniques described herein may be used to generate a transient-obstruction-free version of a high-elevation digital image. On the left, a digital image captured from a high elevation (e.g., a satellite) depicts a geographic area. It also can be seen that a number of clouds are positioned between the ground surface and the vantage point of the satellite, and therefore obstruct portions of the geographic area from view. In addition it can be seen the shadows cast by the clouds also obstruct additional portions of the geographic area.

In the middle image a cloud mask has been detected, e.g., by transient obstruction detection engine 124. The cloud mask has been used to remove obscured pixels that correspond to the clouds or their respective shadows. Put another way, the obscured pixels that align spatially with the geographic units that are obscured by the clouds or their respective shadows have been removed (e.g., values set to black, zeroed out, etc.). In the right image, the removed pixels have been replaced with replacement data generated using techniques described herein. As explained herein, this replacement data estimates the terrain underlying the obscured pixels.

Figure 7:
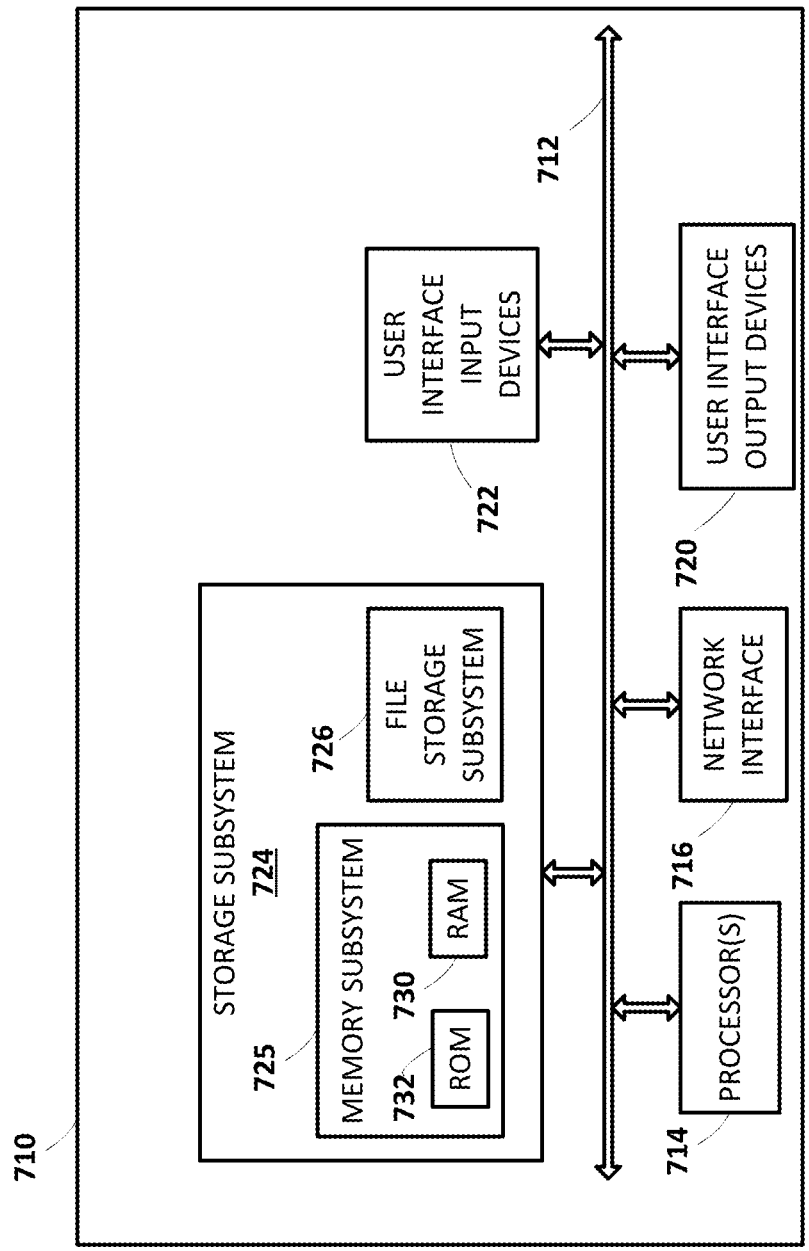
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 500, and/or to implement one or more components depicted in prior figures.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    obtaining a digital image of a geographic area captured from an elevated vantage point, wherein one or more obscured portions of the geographic area are obscured by one or more transient obstructions depicted in the digital image; and
    generating a synthetic digital image based on the digital image, wherein in the synthetic digital image, pixels of one or more of the transient obstructions are replaced with predicted pixels representing underlying terrain, wherein the generating includes applying the digital image of the geographic area as input across a generator model, wherein the generator model is trained as part of a generative adversarial network that also included a discriminator model that is trained in conjunction with the generator model;
    wherein the generator model comprises a memory network, the digital image is one of a temporal sequence of digital images of the geographic area, and the applying includes sequentially applying the temporal sequence of digital images as inputs across the generator model.

2. The method of claim 1, wherein the digital image is captured by a satellite, and the elevated vantage point lies on a trajectory of the satellite.

3. The method of claim 1, wherein the generator model comprises a recurrent neural network.

4. The method of claim 1, wherein the generator model comprises a long short-term memory (LSTM) network.

5. A method implemented using one or more processors, comprising:
    obtaining a digital image of a geographic area captured from an elevated vantage point, wherein one or more obscured portions of the geographic area are obscured by one or more transient obstructions depicted in the digital image; and
    generating a synthetic digital image based on the digital image, wherein in the synthetic digital image, pixels of one or more of the transient obstructions are replaced with predicted pixels representing underlying terrain, wherein the generating includes applying the digital image of the geographic area as input across a generator model, wherein the generator model is trained as part of a generative adversarial network that also included a discriminator model that is trained in conjunction with the generator model;
    wherein the generator model and the discriminator model are trained using at least one training example comprising a high elevation digital image with synthetic transient obstructions added, wherein the synthetic transient obstructions are added by a transient obstruction generation model that is trained as part of another generative adversarial network.

6. A system comprising one or more processors and memory storing instructions that, in response to execution of the instructions by the one or more processors, cause the one or more processors to:
    obtain a digital image of a geographic area captured from an elevated vantage point, wherein one or more obscured portions of the geographic area are obscured by one or more transient obstructions depicted in the digital image; and
    generate a synthetic digital image based on the digital image, wherein in the synthetic digital image, pixels of one or more of the transient obstructions are replaced with predicted pixels representing underlying terrain, wherein to generate the synthetic image, the digital image of the geographic area is applied as input across a generator model, wherein the generator model is trained as part of a generative adversarial network that also included a discriminator model that is trained in conjunction with the generator model;
    wherein the generator model comprises a memory network, the digital image is one of a temporal sequence of digital images of the geographic area, and the generating includes applying the temporal sequence of digital images as inputs across the generator model.

7. The system of claim 6, wherein the digital image is captured by a satellite, and the elevated vantage point lies on a trajectory of the satellite.

8. The system of claim 6, wherein the generator model comprises a recurrent neural network.

9. The system of claim 6, wherein the generator model comprises a long short-term memory (LSTM) network.

10. A system comprising one or more processors and memory storing instructions that, in response to execution of the instructions by the one or more processors, cause the one or more processors to:
    obtain a digital image of a geographic area captured from an elevated vantage point, wherein one or more obscured portions of the geographic area are obscured by one or more transient obstructions depicted in the digital image; and generate a synthetic digital image based on the digital image, wherein in the synthetic digital image, pixels of one or more of the transient obstructions are replaced with predicted pixels representing underlying terrain, wherein to generate the synthetic image, the digital image of the geographic area is applied as input across a generator model, wherein the generator model is trained as part of a generative adversarial network that also included a discriminator model that is trained in conjunction with the generator model;

wherein the generator model and the discriminator model are trained using at least one training example comprising a high elevation digital image with synthetic transient obstructions added, wherein the synthetic transient obstructions are added by a transient obstruction generation model that is trained as part of another generative adversarial network.

* * * * *